(12) United States Patent
Tamburin et al.

(10) Patent No.: US 9,781,883 B1
(45) Date of Patent: Oct. 10, 2017

(54) UNIVERSAL HAY APPARATUS

(71) Applicants: Kari Tamburin, Gunter, TX (US); Mark Tamburin, Gunter, TX (US)

(72) Inventors: Kari Tamburin, Gunter, TX (US); Mark Tamburin, Gunter, TX (US)

(*) Notice: Subject to any disclaimer, the term of this patent is extended or adjusted under 35 U.S.C. 154(b) by 0 days.

(21) Appl. No.: 15/406,682

(22) Filed: Jan. 14, 2017

(51) Int. Cl.
 B62B 1/10 (2006.01)
 B62B 1/12 (2006.01)
 B62B 1/18 (2006.01)
 B62B 1/20 (2006.01)
 A01D 93/00 (2009.01)

(52) U.S. Cl.
 CPC .................... *A01D 93/00* (2013.01)

(58) Field of Classification Search
 CPC .... B62B 1/10; B62B 1/12; B62B 1/18; B62B 1/20
 See application file for complete search history.

(56) References Cited

U.S. PATENT DOCUMENTS

| 177,949 | A | * | 5/1876 | McKinney | B62B 1/264 |
| | | | | | 414/450 |
| 228,967 | A | * | 6/1880 | Woods | B62B 1/264 |
| | | | | | 414/450 |
| 6,059,515 | A | * | 5/2000 | Keller | A01F 25/2036 |
| | | | | | 280/47.131 |
| 2014/0291949 | A1 | * | 10/2014 | Meyer | B62B 1/22 |
| | | | | | 280/47.3 |

\* cited by examiner

*Primary Examiner* — Bryan Evans
(74) *Attorney, Agent, or Firm* — Hulsey PC

(57) ABSTRACT

Embodiments provide a universal hay apparatus and method of use.

9 Claims, 4 Drawing Sheets

UNIVERSAL HAY APPARATUS

CROSS REFERENCE TO RELATED APPLICATION

The present application is related to U.S. patent application Ser. No. 14/955,825, filed Dec. 1, 2015, titled "APPARATUS AND METHOD FOR RETAINING HAY." The disclosure of the application is hereby incorporated by reference in its entirety.

FIELD OF THE INVENTION

The present disclosure relates to a hay bale apparatus, and more specifically to an apparatus for retaining, transporting, and dispensing bales of hay.

BACKGROUND OF THE INVENTION

Hay is typically a messy and disorganized item. Square hay bales become messy and wasteful once the binding wires or twine are cut. Loose hay falls to the floor/ground making the space of a barn or holding space messy and most of the time the messy hay is wasted and not fed to the animal. Additionally, the user needs the ability to move the hay bale when feeding at rodeos, shows, events, etc. A mean to organize, transport, and properly disperse hay would be of great benefit by saving both time and money, as well as keeping an area where hay is stored clean.

BRIEF SUMMARY OF THE INVENTION

The disclosure may provide an apparatus for retaining at least one hay bale, wherein the apparatus may comprise one or more stays along a stay bar that pierce into a hay bale that is placed on steady bar of the apparatus. The apparatus may further comprise wheels for easily transporting the hay bale.

The apparatus is universal because it holds the entire hay bale without the support of the baling twine/wire. The apparatus can be hung on a barn wall, stored on a wall, travel in a horse trailer or back of a vehicle, it transports hay from a hay area to the animal stall. It can transport hay from a trailer to rodeo arena. It can travel across all terrain.

The apparatus is authentic to square hay bales. The design and position of the stays hold the hay in its square bale formation. The design leverages the simplicity of the how straw is woven together in the baling process. No other apparatus exists. The person only handles the hay bale ONCE! Once the person places the hay on the apparatus, the bale is retained until all hay is fed out. The apparatus allows the person to feed the portions of their desire/need.

The apparatus is not intended to be a feeding source for animals. It should not be used as a feeding apparatus due to the nature of the design could be harmful to the animal (e.g. a stay could puncture the face/eye of an animal).

In one embodiment the apparatus may comprise, a handle bar, comprising a first end and a second end; a top connecting beam, comprising a first end, a second end, and a first midpoint, wherein the first end of the top connecting beam is attached to the second end of the handle bar, and the second end of the top connecting beam is attached to the first end of the handle bar; a first parallel vertical side beam having a first end and a second end; wherein the first end of the first parallel vertical side beam is attached to the second end of the handle bar; a second parallel vertical side beam having a first end and a second end; wherein the first end of the second parallel vertical side bar is attached to the first end of the handle bar; a stay bar having a first end and a second end; wherein the first end of the stay bar is attached to the first midpoint of the top connecting beam; a steady bar having an first end, a second end, and a first midpoint and second midpoint; wherein the first end of the steady bar is attached to the second end of the first parallel vertical side beam, and the second end of the steady bar is attached to the second end of the second parallel vertical side beam; a base support beam having a first end and a second end; wherein the first end of the base support beam is attached to the first midpoint of the steady bar, and the second end of the base support beam is attached to the second midpoint of the steady bar; a first wheel, having a first axis; a second wheel, having a second axis; a plurality of stays having an attachment end, wherein the attachment end is connected to the stay bar and the stays extend perpendicularly outward from the stay bar and parallel to the steady bar; a bottom connecting beam having a first end, a second end, and a second midpoint, wherein the first end of the bottom connecting beam is connected to the second end of the first parallel vertical side beam, and the first axis of the first wheel, the second end of the bottom connecting beam is connected to the second end of the second parallel vertical side beam, and the second axis of the second wheel, the first midpoint of the bottom connecting beam is attached to the second end of the stay bar. In one embodiment, the steady bar is a substantially square shape having three sides. In one embodiment, the attachment end of the stays are pivotally attached to the stay bar. In an alternative embodiment, the stays are spaced 4 inches apart along the stay bar. In another embodiment, the apparatus further comprises one or more bun feet attached to the handle bar.

Methods utilizing the apparatus may also be disclosed.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGURES and detailed description. It is intended that all such additional systems, methods, features, and advantages that are included within this description, be within the scope of the appended claims and/or those claims filed now and/or later.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present disclosure may vary in size and configuration.

Figure 1:
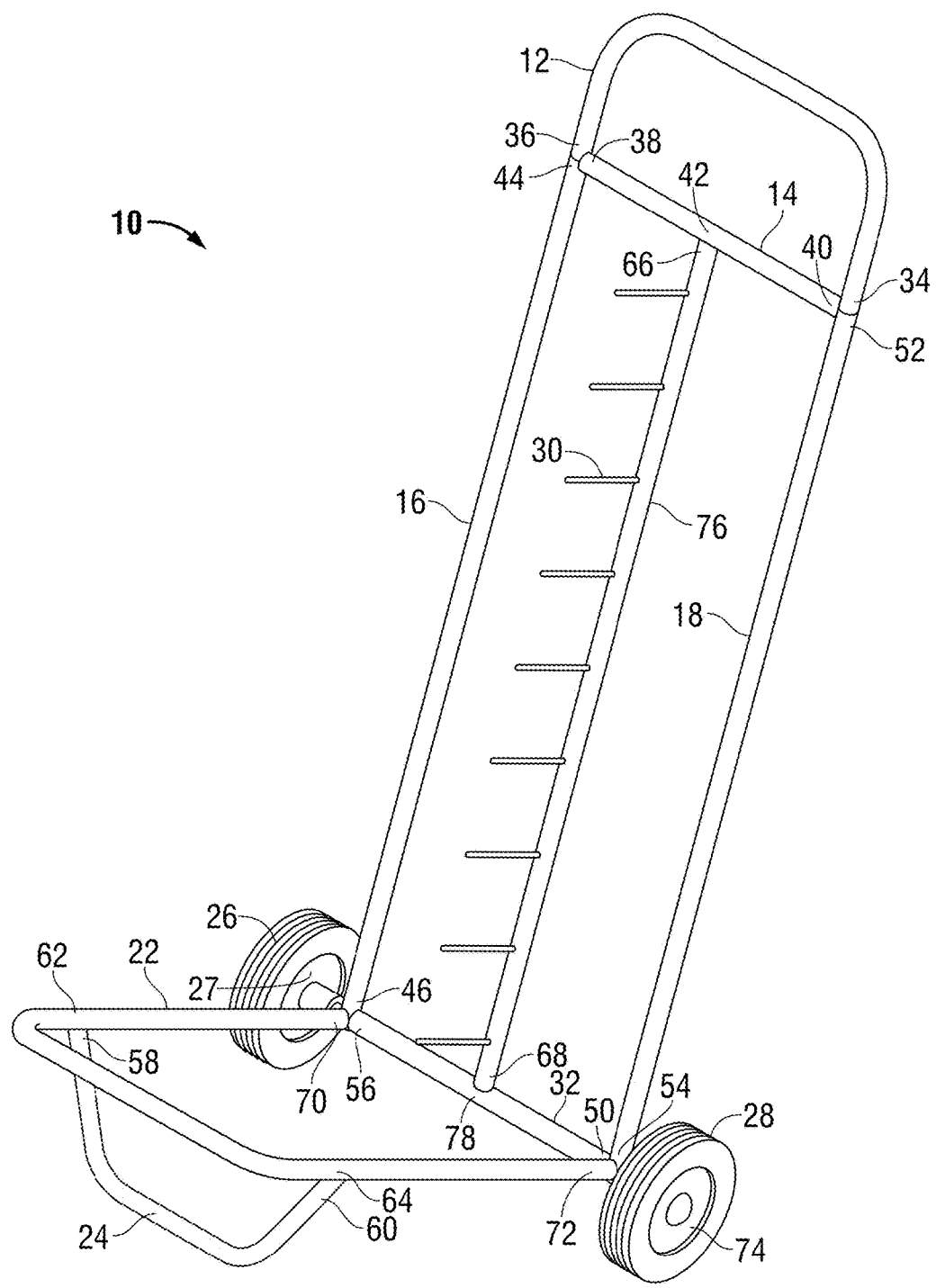
FIG. 1 displays a perspective view of a universal hay apparatus in accordance with embodiments.

FIG. 1 generally depicts a universal hay apparatus (10), having a handle bar (12), a top connecting beam (14), a first parallel vertical side beam (16), a second parallel vertical side beam (18), a stay bar (20), a steady bar (22), a base support beam (24), a first wheel (26), a second wheel (28), a plurality of stays (30), and bottom connecting beam (32). The apparatus depicted in FIG. 1 is configured to support and transport a hay bale.

A more detailed explanation of how the parts are configured in some embodiments includes: a handle bar (12), comprising a first end (34) and a second end (36); a top connecting beam (14), comprising a first end (38), a second end (40), and a first midpoint (42), wherein the first end (38) of the top connecting beam (14) is attached to the second end (36) of the handle bar (12), and the second end (40) of the top connecting beam (14) is attached to the first end (34) of the handle bar (12); a first parallel vertical side beam (16) having a first end (44) and a second end (46); wherein the first end (44) of the first parallel vertical side beam (16) is attached to the second end (36) of the handle bar (12); a second parallel vertical side beam (18) having a first end (52) and a second end (54); wherein the first end (52) of the second parallel vertical side beam (18) (52) is attached to the first end (34) of the handle bar (12); a stay bar (20) having a first end (66) and a second end (68); wherein the first end (66) of the stay bar (20) is attached to the first midpoint (42) of the top connecting beam (14); a steady bar (22) having an first end (70), a second end (72), and a first midpoint (62) and second midpoint (64); wherein the first end (70) of the steady bar (22) is attached to the second end (46) of the first parallel vertical side beam (16), and the second end (72) of the steady bar (22) is attached to the second end (54) of the second parallel vertical side beam (18); a base support beam (24) having a first end (58) and a second end (60); wherein the first end (58) of the base support beam (24) is attached to the first midpoint (62) of the steady bar (22), and the second end (60) of the base support beam (24) is attached to the second midpoint (64) of the steady bar (22); a first wheel (26); a second wheel (28); a plurality of stays (30) having an attachment end (76), wherein the attachment end (76) is connected to the stay bar (20) and the stays extend perpendicularly outward from the stay bar (20) and parallel to the steady bar (22); a bottom connecting beam (32) having a first end (56), a second end (50), and a second midpoint (78), wherein the first end (56) of the bottom connecting beam (32) is connected to the second end (46) of the first parallel vertical side beam (16), and the first axis (27) of the first wheel (26), the second end (50) of the bottom connecting beam (32) is connected to the second end (54) of the second parallel vertical side beam (18), and the second axis of the second wheel (28), the second midpoint (78) is attached to the second end (68) of the stay bar (20). In one embodiment, the steady bar (22) is a substantially square shape having three sides. In one embodiment, the attachment end (76) of the stays are pivotally attached to the stay bar (20). In an alternative embodiment, the stays are spaced 4 inches apart along the stay bar (20).

The handle bar (12), is connected to the top connecting beam (14), and the first parallel vertical side beam (16) and second parallel vertical side beam (18) to allow easier handling of the apparatus by a user. The handle bar (12) may be a cylindrical tube made of metal and allowing the component to be attached by welding. However, other alternatives are contemplated. For example, the handle bar (12) may have a non-slip coating such as rubber or plastic. Alternatively, embodiments of handle bar (12) may be comprised of any rigid material such as wood, metal, aluminum, or plastic.

The top connecting beam (14) is attached to the first parallel vertical side beam (16) and second parallel vertical side beams (18), the handle bar (12), and the stay bar (20). The top connecting beam (14) provides support for the apparatus and may maintain the hay bale in a more stable position.

The first parallel vertical side beam (16) and second parallel vertical side beams (18) provide support and lateral stability to the apparatus and the hay bale. By stabilizing the vertical sides of a hay bale positioned on the apparatus, the hay bale is less likely to fall off or alter position during transport. The first parallel vertical side beam (16) and second parallel vertical side beam (18) connect to the steady bar (22), bottom connecting beam (32), and top connecting beam (14) to provide a substantially square contact surface for the hay bale.

The stay bar (20), comprises a plurality of stays (30). The stays (30) may extend substantially perpendicularly from the stay bar (20) and substantially parallel to the steady bar (22). The stays (30) may be comprised of metal, plastic, wood, or any rigid material capable of maintaining its shape when entering a hay bale. The stays (30) enter the hay bale when the hay bale is placed on the steady bar (22) in a substantially vertical position. The stays (30) serve to provide support and maintain the shape of the hay bale in the absence of string or wire surrounding the hay bale. The stays (30) prevent the many pieces of hay in the hay bale from shifting and ultimately falling out of the hay bale. The stays (30) may be comprised of a length of 1 inch, 2 inches, 3 inches, 4 inches, 5 inches, 6 inches, 7 inches, 8 inches, 9 inches, 10 inches, 11 inches, 12 inches, 13 inches, 14 inches, 15 inches, inches, 17 inches, 18 inches, 19 inches, or 20 inches. Alternatively, the stays (30) may be comprised of a length of 1.5 inch, 2.5 inches, 3.5 inches, 4.5 inches, 5.5 inches, 6.5 inches, 7.5 inches, 8.5 inches, 9.5 inches, 10.5 inches, 11.5 inches, 12.5 inches, 13.5 inches, 14.5 inches, 15.5 inches, 16.5 inches, 17.5 inches, 18.5 inches, 19.5 inches, or 20.5 inches. The stays (30) may comprise a rounded end, or any shape or material to prevent the stay from being a hazard to humans or animals. In some embodiments, the stays (30) may be adjustable along the length of the stay bar (20). Some embodiments may comprise 2, 3, 4, 5, 6, 7, 8, 9, or 10 stays (30) attached to the stay bar (20). In other embodiments, the stays (30) may be positioned along the stay bar (20) for measuring hay portions. The distances between stays (30) may be 3 inches, 4 inches, 5 inches, 6 inches, 7 inches, or 8 inches. The stays (30) may be positioned along the stay bar (20) to measure hay in portions of flakes. One flake of hay may represent 4 inches.

In one embodiment, the steady bar (22) may comprise a curved shape such as a "U" shape, or a substantially square or rectangular shape. This shape provides for a single piece to provide support to the hay bale. Additionally, the steady bar (22) may have a base support beam (24) attached between the two parallel portions of the steady bar (22). The base support beam (24) may be on a lower plane than the steady bar (22), which may allow the hay pale to be positioned in a way that the steady bar (22) provides lateral support preventing the hay bale from shifting horizontally on the base support beam (24).

The bottom connecting beam (32) of the embodiment comprises a first (56) and second end (50) that may each be attached to the axis of a wheel. The first end (56) of the bottom connecting beam (32) connects with the first axis (27) of a first wheel (26), and the second end (50) of the bottom connecting beam (32) connects to the second axis (74) of the second wheel (28). The first end (56) of the bottom connecting beam (32) may also connect to the second end (46) of the first parallel vertical side beam (16), and the first end (70) of the steady bar (22). The second end (50) of the bottom connecting beam (32) may connect to the second end (54) of the second parallel vertical side beam (18), and the second end (72) of the steady bar (22). The bottom connecting beam (32) additionally may have a second midpoint (78), wherein the second midpoint (78) is attached to the second end (68) of the stay bar (20).

An embodiment of the hay bale apparatus may comprise a handle bar (12), comprising a first end (34) and a second end (36); a top connecting beam (14), comprising a first end (38), a second end (40), and a first midpoint (42), wherein the first end (38) of the top connecting beam (14) is attached to the second end (36) of the handle bar (12), and the second end (40) of the top connecting beam (14) is attached to the first end (34) of the handle bar (12); a first parallel vertical side beam (16) having a first end (44) and a second end (46); wherein the first end (44) of the first parallel vertical side beam (16) is attached to the second end (36) of the handle bar (12); a second parallel vertical side beam (18) having a first end (52) and a second end (54), wherein the first end (52) of the second parallel vertical side beam (18) is attached to the first end (34) of the handle bar (12); a stay bar (20) having a first end (66) and a second end (68), wherein the first end (66) of the stay bar (20) is attached to the first midpoint (42) of the top connecting beam (14); a steady bar (22) having an first end (70), a second end (72), and a first midpoint (62) and second midpoint (64), wherein the first end (70) of the steady bar (22) is attached to the second end (46) of the first parallel vertical side beam (16), and the second end (72) of the steady bar (22) is attached to the second end (54) of the second parallel vertical side beam (18), a base support beam (24) having a first end (58) and a second end (60), wherein the first end (58) of the base support beam (24) is attached to the first midpoint (62) of the steady bar (22), and the second end (60) of the base support beam (24) is attached to the second midpoint (64) of the steady bar (22); a first wheel (26), having a first axis (27); a second wheel (28), having a second axis (74); a plurality of stays (30) attached to the stay bar (20) and extending perpendicularly outward from the stay bar (20) and parallel to the steady bar (22); a bottom connecting beam (32) having a first end (56), a second end (50), and a second midpoint (78), wherein the first end (56) of the bottom connecting beam (32) is connected to the second end (46) of the first parallel vertical side beam (16), and the first axis (27) of the first wheel (26), the second end (50) of the bottom connecting beam (32) is connected to the second end (54) of the second parallel vertical side beam (18), and the second axis (74) of the second wheel (28), and the second midpoint (78) is attached to the second end (68) of the stay bar (20).

Figure 2A:
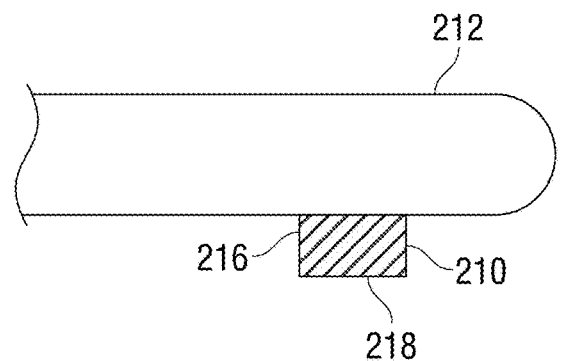
FIGS. 2a, 2b, and 2c depicts a top plan view, top perspective view, and back plan view a universal hay apparatus with bun feet attached to the handle bar in accordance with embodiments.
Figure 2B:
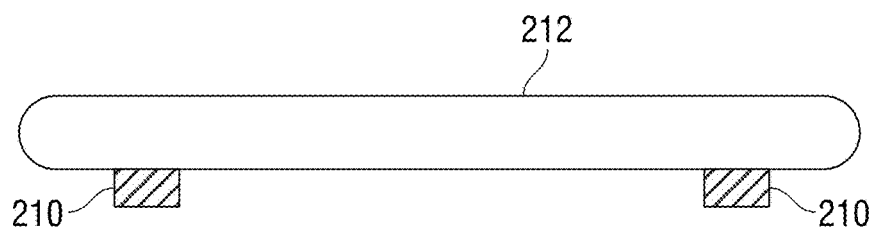
Figure 2C:
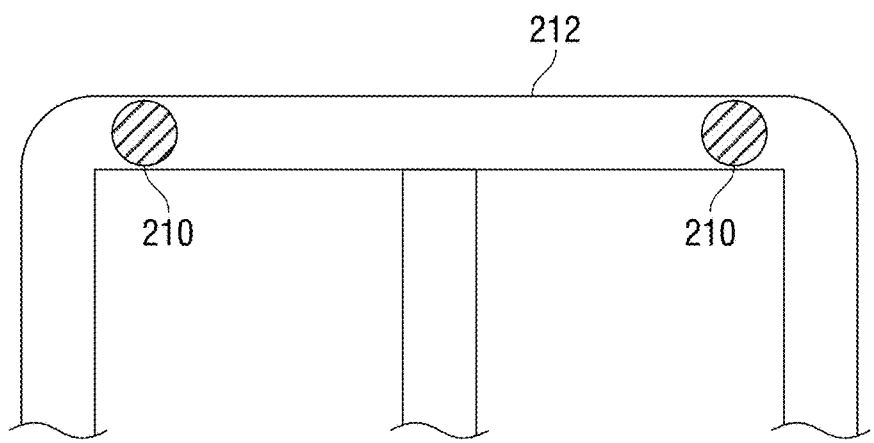

FIGS. 2a, 2b, and 2c generally depicts a top plan view, top perspective view, and back plan view respectively of a universal hay apparatus comprising bun feet (210).

The bun feet (210), may be a block, a cylinder, or any shape that is of sufficient thickness to provide an area between the handle bar (212) and another surface. An example of another surface that the bun feet (210) would act as a buffer for the handle bar (212) is the ground, a wall, a trailer floor, or any other surface the universal hay apparatus may be placed on or against. One or more bun feet (210) may be attached to the handle bar of the universal hay apparatus. In one embodiment, only one bun feet (210) is attached to the handle bar. In another embodiment, a plurality of bun feet (210) may be attached to the handle bar. However, other alternatives are contemplated. For example, the bun feet (210) can have an attachment end (216) and a contact end (218). The bun feet (210) may be comprised of metal, plastic, wood, or any material capable of withstanding the pressure of one or more 100-pound hay bales.

Figure 3A:
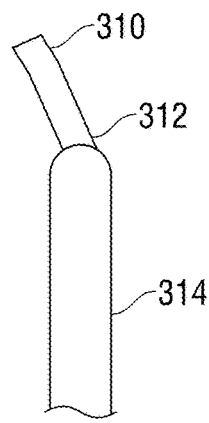
FIGS. 3a, and 3b depicts a side plan view, and a front plan view of an embodiment with a third handle in accordance with embodiments.
Figure 3B:
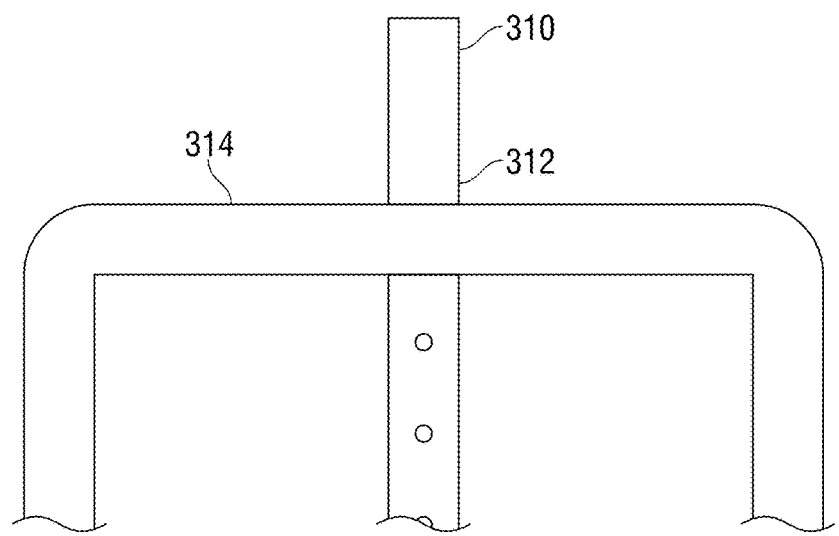

FIGS. 3a, and 3b generally depicts a side plan view, and a front plan view respectively of an embodiment having a third handle (310) in accordance with embodiments. The third handle (310) comprises a connection end (312) that attaches to the handle bar (314). The third handle (310) allows a user to grab the apparatus if there is not enough clearance between the handle bar (314) and another surface for a user to place their hand around the handle bar (314) and gain sufficient grip to move the apparatus.

The third handle (310) may comprise a metal, plastic, or wooden extension from the handle bar (314). However, other alternatives are contemplated. For example, the third handle can have a texturized cover providing better grip for a user. The third handle (310) may be the shape of a cylinder. The third handle (310) may be angled away from the handle bar (314). The third handle (310) may be curved or straight.

Figure 4:
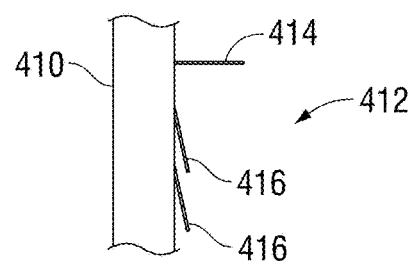
FIG. 4 displays a side plan view of a universal hay apparatus with collapsible stays in accordance with embodiments.

FIG. 4 generally depicts a stay beam (410) having collapsible stays (412) in accordance with the embodiments. The stays (412) depicted in FIG. 4, show a first stay (414) extending perpendicularly to the stay beam (410) and a plurality of collapsed stays (416) near parallel with the stay beam (410). The stays (412) may be pivotally attached to the stay beam (410) enabling the stays (412) to maintain a position perpendicular to the stay beam (410). Alternatively, the stays (412) may be attached to the stay beam (410) with hinges.

Figure 5:
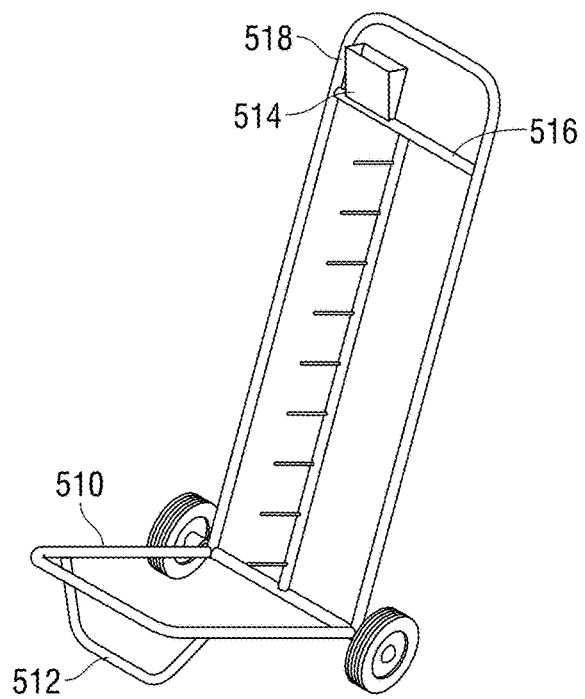
FIG. 5 generally depicts an alternative embodiment comprising a container.

FIG. 5 generally depicts an embodiment comprising a container attached to the handle bar and top connecting beam. The container may be useful in holding a cutting device to cut the wire or string holding the bale of hay together or for holding a device for removing hay from the bale. Storage of other tools and objects is envisioned. The container may be collapsible, foldable, or in an alternative position that enables the device to be placed flush against a wall.

FIG. 5 further depicts the base support beam (510) extending in a plane perpendicular to the steady bar (512). The base support beam (510) may extend outward enough to allow the steady bar (512) to maintain an angle of 5, 10, 15, 20, 25, 30, 35, 40, 45, 50, 55, or 60 degrees in relation to the ground. This angle helps to maintain a hay bale in a stable position on the apparatus.

FIG. 5 further depicts a container (514) that may be pivotally attached to the top connecting beam (516) and/or handle bar (518) for the purposes of collapsing the container when not in use or to take up less space. The container (514) may be comprised of plastic, metal, or wood. However, other alternatives are contemplated. Alternatively, embodiments of the container (514) may be comprised of any rigid material. In some embodiments, the container (514) is within the same plane as the top connecting beam (516) allowing the apparatus to be placed flush against a wall.

Figure 6:
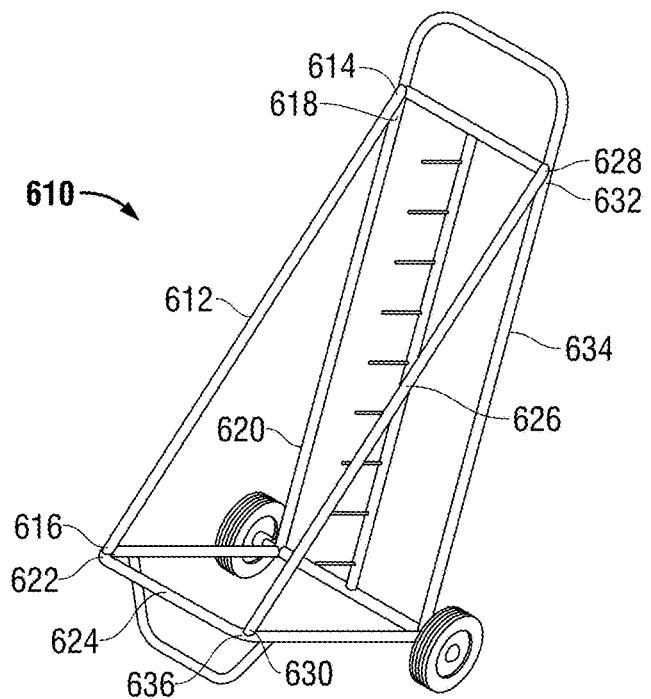
FIG. 6 generally depicts an alternative embodiment comprising side bracing arms.

FIG. 6 generally depicts an embodiment of a hay bale apparatus (610) comprising a first side bracing arm (612) and a second side bracing arm (626). The first side bracing arm (612) may comprise a top end (614) and a bottom end (616). The top end (614) of the first side bracing arm (612) may be attached to the first end (618) of the first parallel vertical side bar (620), and the bottom end (616) first side bracing arm (612) may be attached to a first front edge (622) of the steady bar (624). The second side bracing arm (626) may comprise a top end (628) and a bottom end (630). The top end (628) of the second side bracing arm (626) may be attached to the first end (632) of the second parallel vertical side bar (634), and the bottom end (630) of the second side bracing arm (626) may be attached to a second front edge (636) of the steady bar (624). The first side bracing arm (612) and the second side bracing arm (626) may provide support for the hay bale, and enable the hay bale to maintain form after a wire or string is cut that was maintaining the shape of the hay bale. Methods of attachment include welding, gluing, and bolting.

A method for transporting hay comprising: providing the hay bale apparatus, placing a hay bale on the steady bar of the universal hay apparatus, and pressing the hay bale onto stays. Optionally, an embodiment may include cutting the binding wire or twine encircling the hay bale, after placing the hay bale on the apparatus. A user may then grab the handle bar, and tilt the apparatus so that the base support beam is lifted and no longer providing support to the apparatus. Finally, the user may maneuver the apparatus to a desired location using a pulling or pushing force.

The components of the apparatus may be comprised of a cylindrical tube made of metal and allowing the component to be attached by welding, gluing, and bolting. However, other alternatives are contemplated. For example, components may have a non-slip coating such as rubber or plastic. Alternatively, embodiments of the components may be comprised of any rigid material such as wood, metal, aluminum, or plastic.

EXAMPLE

In one example of the apparatus, the overall height is 47 inches tall, with an outside width of 19.5 inches, an inside width of 17.5 inches, and stays that are 8 inches long. A user might place a hay bale on the base and lean it into the stays allowing the stays to penetrate the hay bale. Next, the user might cut any wire or string binding the hay. The user would then lean apparatus so that only the wheels are touching the ground, then proceed to maneuver the hay to the desired location. Once the user is at the location, they may remove some or all of the hay to place inside an animal pen, or feeding trough. Once the user is done with the apparatus, they may leave it standing vertically, or lift the apparatus and hang it on a hook attached to a wall.

What is claimed is:

1. A universal hay apparatus for retaining, transporting, and dispensing hay comprising:
    a handle bar, comprising a first end and a second end;
    a top connecting beam, comprising a first end, a second end, and a first midpoint,
        wherein the first end of the top connecting beam is attached to the second end of the handle bar, and the second end of the top connecting beam is attached to the first end of the handle bar;
    a first parallel vertical side beam having a first end and a second end;
        wherein the first end is attached to the second end of the handle bar;
    a second parallel vertical side beam having a first end and a second end;
        wherein the first end of the second parallel vertical side bar is attached to the first end of the handle bar;
    a stay bar having a first end and a second end;
        wherein the first end is attached to the first midpoint of the top connecting beam;
    a steady bar having an first end, a second end, and a first midpoint and second midpoint;
        wherein the first end of the steady bar is attached to the second end of the first parallel vertical side beam, and the second end of the steady bar is attached to the second end of the second parallel vertical side beam;
    a base support beam having a first end and a second end;
        wherein the first end of the base support beam is attached to the first midpoint of the steady bar, and the second end of the base support beam is attached to the second midpoint of the steady bar;
    a first wheel, having a first axis;
    a second wheel, having a second axis;
    a plurality of stays having an attachment end, wherein the attachment end is connected to the stay bar and the stays extend perpendicularly outward from the stay bar and parallel to the steady bar;
    a bottom connecting beam having a first end, a second end, and a first midpoint,
        wherein the first end of the bottom connecting beam is connected to the second end of the first parallel vertical side beam, and the first axis of the first wheel
        the second end of the bottom connecting beam is connected to the second end of the second parallel vertical side beam, and the second axis of the second wheel,
        the first midpoint of the bottom connecting beam is attached to the second end of the stay bar.

2. The apparatus of claim 1, wherein the steady bar is a substantially square shape having three sides.

3. The apparatus of claim 1, wherein the attachment end of the stays are pivotally attached to the stay bar.

4. The apparatus of claim 1, wherein the stays are spaced 4 inches apart along the stay bar.

5. The apparatus of claim 1, comprising a third handle having a connection end, wherein the connection end is attached to the handle bar.

6. The apparatus of claim 1, comprising one or more bun feet attached to the handle bar.

7. The apparatus of claim 1, further comprising one or more connection ends of one or more stays are attached to the first and second parallel vertical side beams.

8. The apparatus of claim 1, wherein the steady bar has a first front edge and a second front edge, further comprising:
- a first side bracing arm, having a top end and a bottom end, wherein the top end of the first side bracing arm is attached to the first end of the first parallel vertical side bar, and the bottom end of the first side bracing arm is attached to a first front edge of the steady bar;
- a second side bracing arm, having a top end and a bottom end, wherein the top end of the second side bracing arm is attached to the first end of the second parallel vertical side bar, and the bottom end of the second side bracing arm is attached to a second front edge of the steady bar.

9. A method for retaining, transporting, and dispensing hay comprising:
- providing the apparatus of claim 1,
- placing a hay bale on the steady bar of claim 1,
- pressing hay bale onto the stays,
- cutting the binding wire or twine encircling the hay bale,
- grabbing the handle bar,
- tilting the apparatus so that the base support beam is lifted and no longer providing support to the apparatus, and
- maneuvering the apparatus to a desired location through the use of pulling or pushing force.

* * * * *